M. SITNEY.
POWER TRANSMISSION MECHANISM.
APPLICATION FILED OCT. 9, 1918.
1,364,325. Patented Jan. 4, 1921.
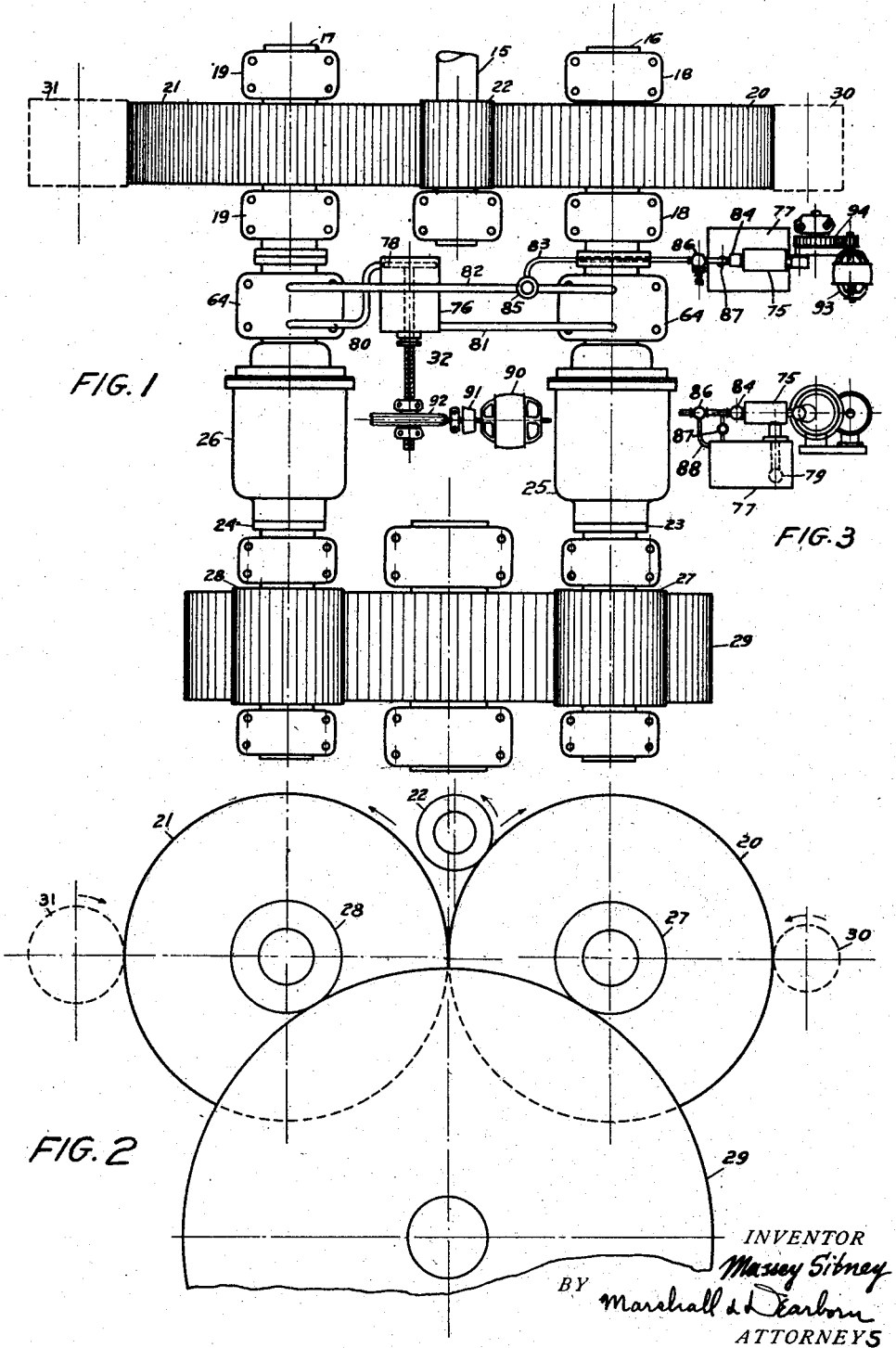

UNITED STATES PATENT OFFICE.

MASSEY SITNEY, OF BROOKLYN, NEW YORK.

POWER-TRANSMISSION MECHANISM.

1,364,325.      Specification of Letters Patent.      Patented Jan. 4, 1921.

Application filed October 9, 1918. Serial No. 257,509.

*To all whom it may concern:*

Be it known that I, MASSEY SITNEY, a citizen of the United States of America, and a resident of Brooklyn, Kings county, and State of New York, have invented certain new and useful Improvements in Power-Transmission Mechanisms, of which the following is a specification, reference being had to the accompanying drawings, forming a part thereof.

My invention relates to mechanisms for the transmission of power by mechanical means and has special reference to such as embody selective clutches for determining the direction in which the driven member of the mechanism is operated.

When a steam turbine or the like, which is arranged and adapted to operate only in one direction of rotation, is utilized for driving marine propellers, rolling mills or other loads which require either forward or reverse operation, a combination of clutches and gears is usually employed. One arrangement of this kind is shown and disclosed in my Patent No. 1,248,735 granted Dec. 4, 1917. Power transmission mechanism of this character may be called upon to transmit very large power and it has been difficult and expensive to provide clutches which are adequate for the purpose when used in the ordinary manner.

According to my present invention I provide a simple and effective power transmission mechanism which consists in a novel and useful combination of gearing and clutches whereby the gearing is used effectively and only a pair of relatively small, identical clutches are necessary to transmit the required power.

My invention provides a mechanism which is peculiarly adapted for its intended purpose and I believe that I am the first to provide an adequate and satisfactory solution of a power transmission problem which is well understood by those skilled in this art.

In order that my invention may be thoroughly understood, I will now proceed to describe the same in the following specification, and will then point out the novel features thereof in appended claims.

Referring to the drawings:

Figure 1 is a plan view of a transmission mechanism arranged and constructed in accordance with my invention and constituting an embodiment thereof.

Fig. 2 is a diagrammatic elevation of the transmission mechanism, and

Fig. 3 is an elevation of the fluid pressure pump.

The mechanism illustrated comprises a driving shaft 15, a pair of gear shafts 16 and 17 which are mounted in bearings 18 and 19, and to which are secured gear wheels 20 and 21. The driving shaft 15 has a pinion 22 which meshes with the gear wheel 20, the gear wheels 20 and 21 being in mesh with each other as clearly shown in Fig. 2. A pair of clutch shafts 23 and 24 are adapted to be connected respectively to the shafts 16 and 17 by clutches 25 and 26. Mounted on the clutch shafts 23 and 24 are pinions 27 and 28 which mesh with a gear wheel 29.

The gear wheels 20 and 21 constitute the driving members of the apparatus and they may be connected to a steam turbine or other suitable driving engine or motor by the pinion 22 on the turbine shaft. The gear wheels 20 and 21 may in fact mesh with two or more pinions of varying sizes of which the pinions 30 and 31 (shown in dotted lines) are examples, to enable them to be driven by engines or motors which operate at unlike speeds. The utility of such an arrangement will be readily understood and the pinions 30 and 31 may for example, be connected respectively to high pressure and low pressure turbines.

The clutches are preferably actuated by fluid pressure and the pump 32 constitutes a convenient means for governing the action of the fluid to control the operation of the clutches.

The clutches are alike and may be constructed in any suitable manner such as those, for example, which are described in detail in my copending application Serial No. 200,260 filed November 5, 1917, of which this application is a continuation in part.

The pump 32 comprises a pumping cylinder 76 and a piston 78 which operates therein and is actuated by a motor 90 through a friction clutch 91 and worm gearing 92. The motor is reversed in the usual manner to move the piston as desired. The pumping cylinder 76 is connected at one end by a pipe 80 to the clutch 26 and at its opposite end it is connected by a pipe 81 to the clutch 25; the clutches are interconnected by a pipe 82 so that when one is actuated the other is released.

The pipe 82 is connected by a three-way valve 85 and a pipe 83 to an oil pressure pump 75 which will be very small and may be operated by any suitable means such as a small electric motor 93 and gearing 94.

The motor operates the pressure pump continuously and the oil is taken from a tank 77 and is delivered to the pipe 83. When the pressure exceeds a predetermined amount, a pressure regulating valve 86 opens and permits the oil to flow back to tank 77 through a small pipe 88. If desired the load may be taken from the pump 75 by opening a free or open by-pass valve 87 which is hand operated.

The operation of the clutches is as follows: Assuming that the parts occupy the positions in which they are shown in Fig. 1, the clutch 26 being released and the clutch 25 set,—if the three-way valve 85 is set to close pipe 83 and interconnect the parts of pipe 82 and then the motor 90 is so operated as to actuate the piston 78,—the oil will be forced from cylinder 76 into pipe 81 and will be drawn into the opposite end of the cylinder from pipe 80. Clutch 25 is thus released and clutch 26 set.

In order to apply considerable hydraulic pressure to set the clutch 26 and hold it in this position under load, the three-way valve 85 is now set to connect pipe 83 with the left hand portion of pipe 82, thus utilizing the full pressure developed by the pressure pump 75.

Under these conditions, if the driving pinion 22 rotates as indicated by the arrow shown in Fig. 2, it is evident that the shafts 16 and 17 with their affixed driving clutch parts, will rotate in opposite directions.

By reason of the fact that the gear shafts 16 and 17 are connected by direct gears they always operate in opposite directions. Consequently, with the clutch 26 set, as assumed, the pinion 28 rotates in the same direction as the pinion 22 and gear 29 in the opposite direction.

Assuming that it is now desired to reverse the direction of rotation of the gear 29, the three-way valve 85 is timed to close pipe 83 and open the passage through pipe 82, then the motor 90 is operated in the opposite sense of its former operating direction and returns the piston 78 to the position shown in Fig. 1. The clutch 26 is thus released and the clutch 25 set. The three-way valve 85 is now set to open the passage from pipe 83 to the right and supplies relatively high pressure for setting and holding the clutch 25.

Apparatus of preferred form and construction has been illustrated and described for the purpose of showing a way in which this invention may be used, but the inventive thought upon which this application is based, is broader than this illustrative embodiment thereof, and I therefore intend no limitations other than those imposed by the appended claims.

What I claim is:

1. A clutch system comprising a driving shaft, a pinion thereon, a pair of gear shafts, coöperating gears therefor, said pinion meshing with one of said gears, a pair of clutch shafts, fluid actuated clutches connecting the clutch shafts with the gear shafts, pinions on the clutch shafts, a driven shaft and a gear thereon meshing with the pinions of the clutch shafts, means for releasing one and setting the other of the clutches and independent relatively high pressure means for holding either clutch set.

2. A clutch system comprising a high speed driving shaft, a low speed driven shaft, a pair of clutch shafts geared to the driven shaft to operate at a speed that is high relative to the speed of said driven shaft, fluid actuated clutches for connecting the clutch shafts to the driving shaft, whereby the clutch shafts may operate in either direction of rotation, means for releasing one and setting the other of the clutches, and independent relatively high pressure means for holding either clutch set.

3. A clutch system comprising a high speed driving shaft, a low speed driven shaft, a pair of clutch shafts geared to the driven shaft to operate at a speed that is high relative to the speed of said driven shaft, gear shafts, coöperating therewith, one of which is connected to the driving shaft, fluid actuated clutches interposed between the clutch shafts and the gear shafts, means for releasing one and setting the other of the clutches, and independent relatively high pressure means for holding either clutch set.

4. A gearing comprising a pair of fluid actuated clutches, means for releasing one and setting the other of the clutches and independent relatively high pressure means for holding either clutch set.

5. A gearing comprising a pair of interconnected liquid actuated clutches, means for releasing one and setting the other of the clutches, and means for exerting an independent relatively high pressure on the liquid to hold either clutch in its set position.

6. A gearing comprising a pair of clutches, a hydraulic system for actuating the clutches and an independent pressure pump for increasing the hydraulic pressure in a selected portion of the system to hold either clutch in its set position.

7. A gearing comprising a pair of clutches, an interconnected hydraulic system for actuating the clutches, an independent high pressure pump, a source of supply therefor, means for actuating the pump, a pressure regulating valve for determining the maximum pressure, and means for connecting the high pressure pump to the hydraulic actuating system for the clutches.

8. A reversing gearing comprising a pair of clutches, a cylinder connected at its ends to the respective clutches, an actuating piston in the cylinder, a pipe inter-connecting the clutches, and means for actuating the piston to release one of the clutches and set the other, and independent means for increasing the pressure in the system for holding the clutches set.

9. A reversing gearing comprising a pair of clutches, a cylinder connected at its ends to the respective clutches, an actuating piston in the cylinder, a pipe inter-connecting the clutches, and means for actuating the piston to release one of the clutches and set the other; and an independent high pressure fluid pump adapted to be connected to said interconnecting pipe to hold the clutches set.

10. A reversing gearing comprising a pair of clutches, a hydraulic cylinder having its ends connected to the respective clutches at their release ends, means for interconnecting the clutches at their actuating ends, a piston in the hydraulic cylinder for releasing one clutch and setting the other, an independent high pressure pump connected to the interconnecting pipe, and means for establishing a connection between the high pressure pump and the clutch to be set.

11. A reversing gearing comprising a pair of clutches, a hydraulic cylinder having its ends connected to the respective clutches at their release ends, means for interconnecting the clutches at their actuating ends, a piston in the hydraulic cylinder for releasing one clutch and setting the other, an independent high pressure pump connected to the interconnecting pipe, and a three-way valve for either connecting the high pressure pump to the one clutch or the other, or for establishing an open connection through the pipe between clutches.

In witness whereof, I have hereunto set my hand this 24 day of Sept., 1918.

MASSEY SITNEY.